Patented May 10, 1932

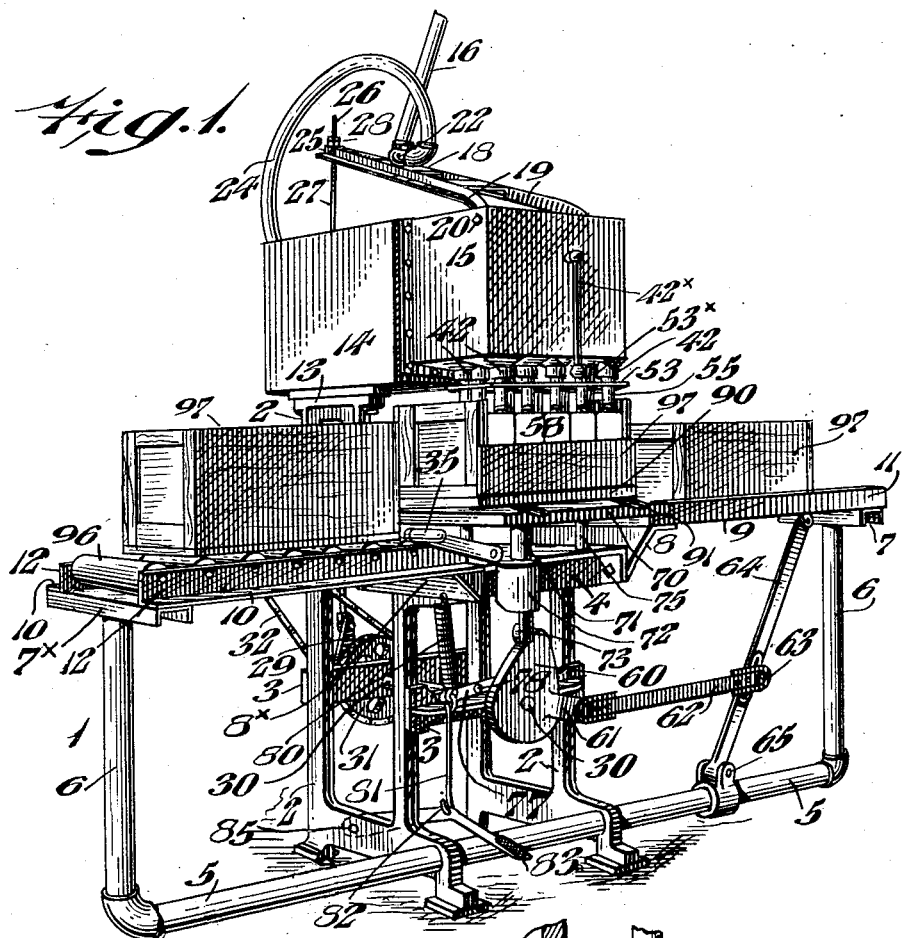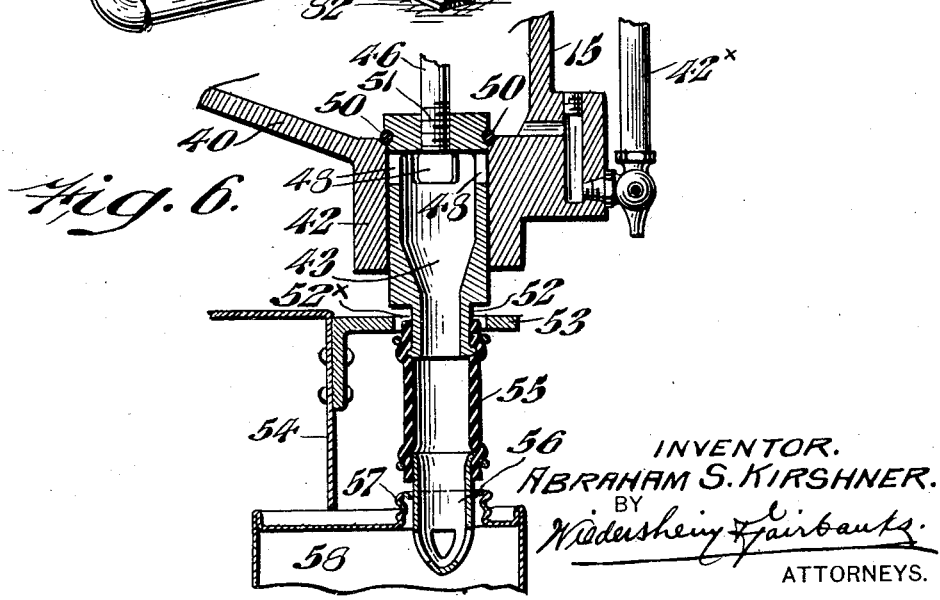

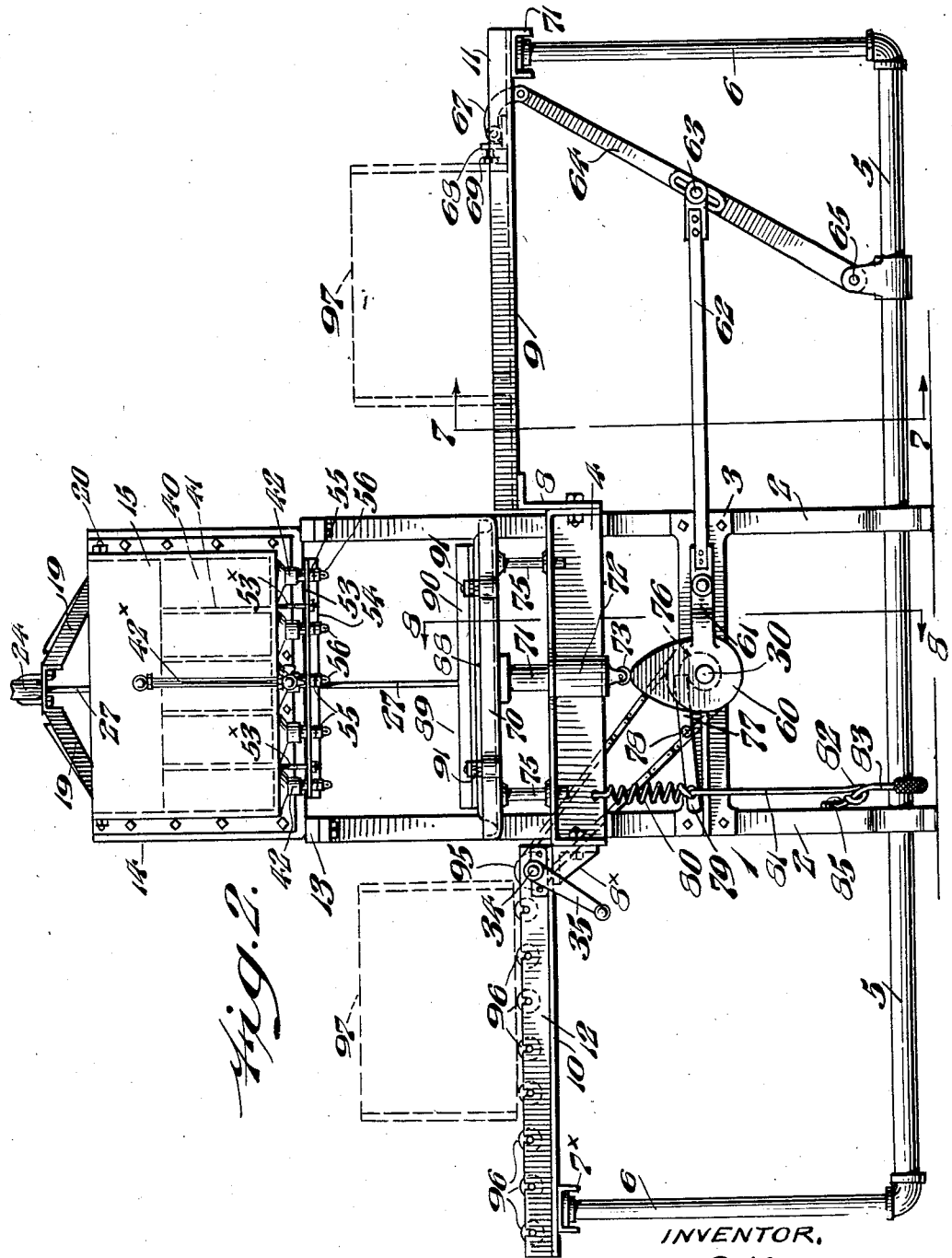

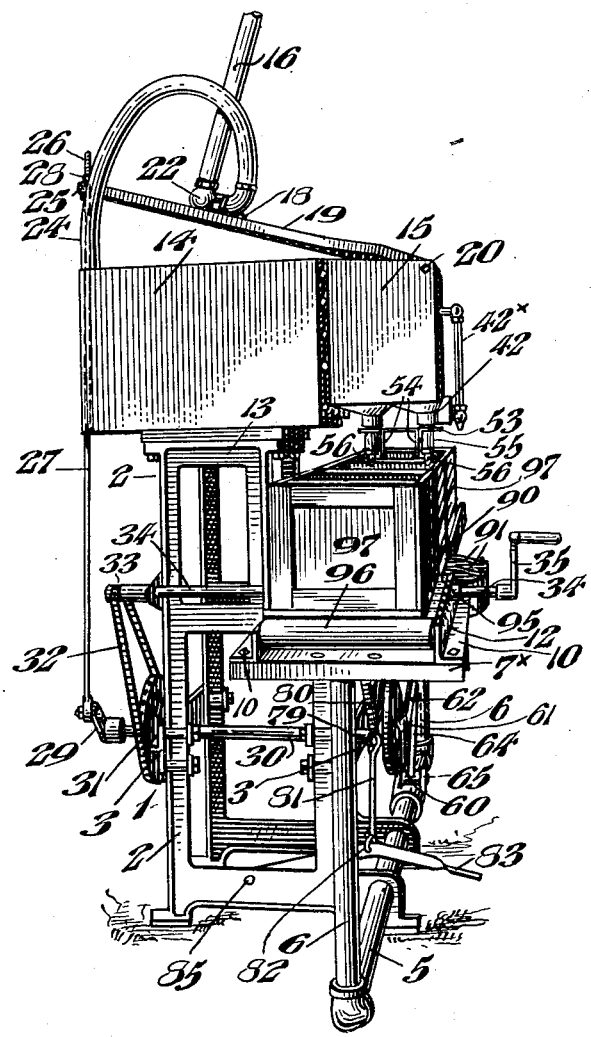

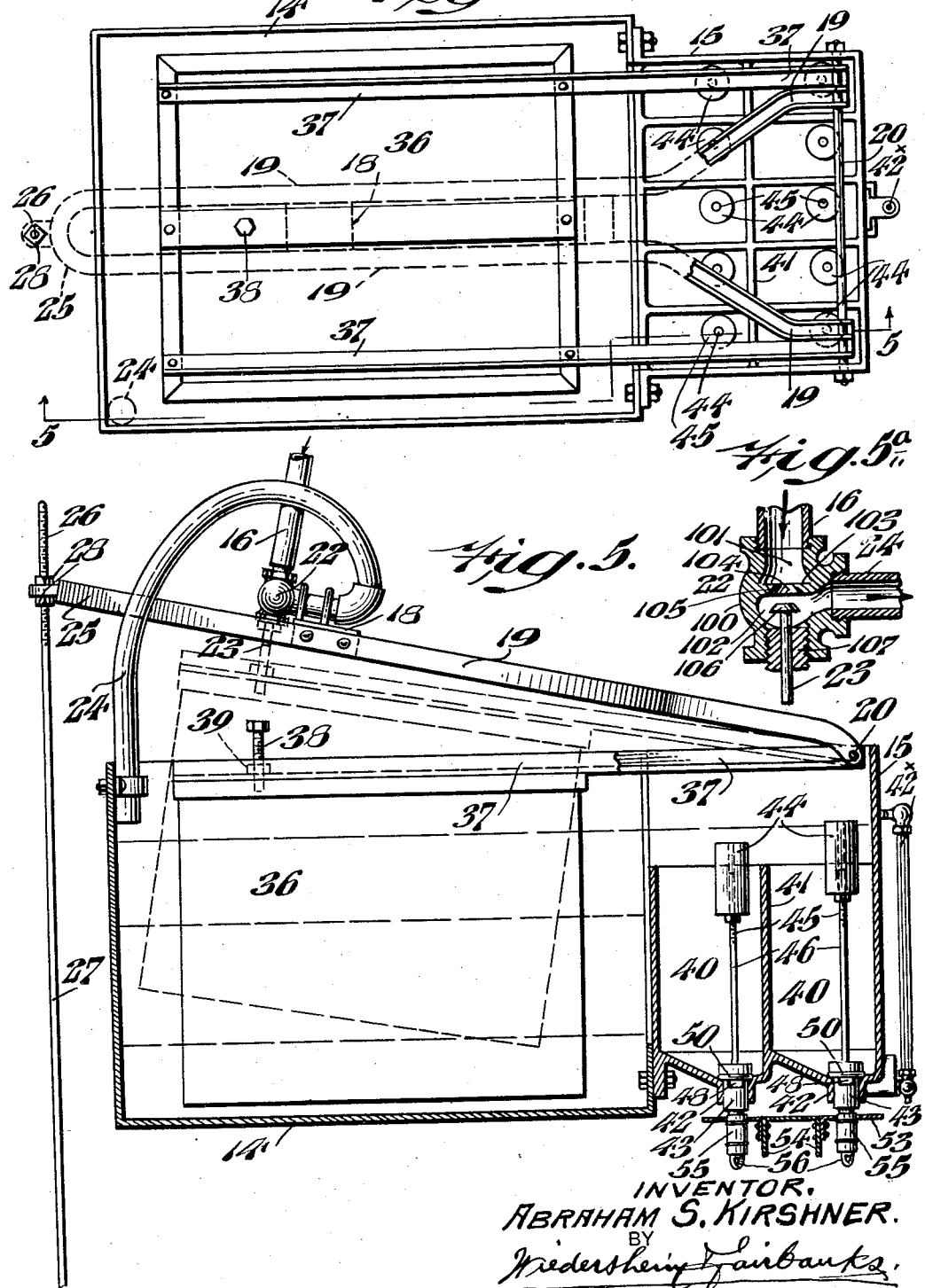

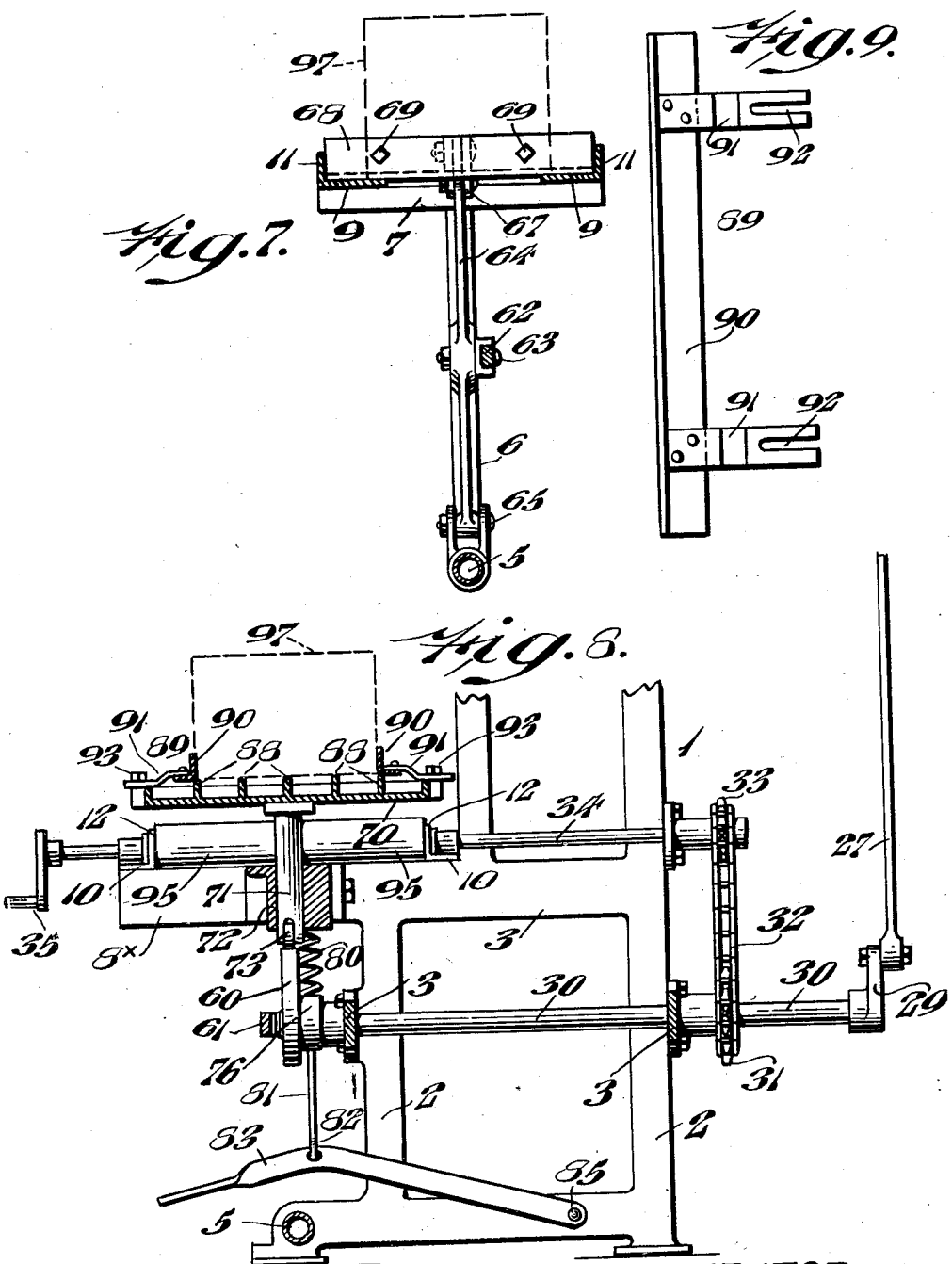

1,857,915

UNITED STATES PATENT OFFICE

ABRAHAM S. KIRSHNER, OF PHILADELPHIA, PENNSYLVANIA

LIQUID FILLING MACHINE

Application filed December 11, 1929. Serial No. 413,155.

My invention relates to a new and useful filling machine whereby any desired number of receptacles may simultaneously and automatically be filled or charged with any desired liquid or fluid in accurate predetermined or measured quantities.

My invention further relates to a filling machine of this character, which, in addition to being highly efficient and automatic, is of an extremely simple and durable construction.

To the above ends, my invention consists of a main supply tank adapted to contain a liquid, a measuring tank communicating therewith, and having measuring compartments formed therein, means for displacing the liquid from said main tank to the compartments in said measuring tank, means for aligning a battery of receptacles with the discharge nozzles of said measuring compartments, means for effecting the transfer of fluid from said measuring compartments to said receptacles, and means for withdrawing the filled or charged receptacles.

It further consists in the employment of a manual control for initially depressing a float element to displace a predetermined amount of the liquid and to cause it to flow from the main tank into the measuring compartments, said manual control also actuating a cam element, whereby the battery of receptacles is raised into operative position with respect to the discharge nozzles of the measuring compartments.

It further consists of a novel cam element which serves to raise and lower the platform, supporting the receptacles to be filled, said cam also serving to actuate the propelling mechanism, which moves a battery of unfilled receptacles into filling position, and also serves to move a battery of filled receptacles away from the filling mechanism.

It further consists of a novel foot actuated locking mechanism, which normally maintains the entire apparatus in locked or inoperative condition until the foot pedal is depressed.

It further consists of novel weighted valves, adapted normally to close the outlets of the measuring compartments, the opening of said valves being effected by the raising of the receptacles being filled.

It further consists of a normally open novel valved inlet for the main supply tank, the valve stem thereof being actuated by the use of the float in said main tank to close said inlet, when the float is raised to a predetermined point.

My invention further relates to a novel supporting frame and actuating mechanism for effecting the objects above set forth.

My invention further consists of various other novel features of construction and advantages all as will be hereinafter fully described and claimed.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the accompanying drawings:

Fig. 1 represents a front perspective view of a novel filling machine embodying my invention.

Fig. 2 represents a front elevation of Fig. 1.

Fig. 3 represents an end perspective view of Fig. 1.

Fig. 4 represents a fragmentary plan view of the main and measuring tanks at the top of Fig. 1.

Fig. 5 represents a section on line 5—5 of Fig. 4.

Fig. 5a represents a sectional view of the valve seen at the top of Fig. 5.

Fig. 6 represents on an enlarged scale a vertical sectional view showing details of construction of the lower valved outlets in the bottom of the compartments in the measuring tank, shown applied to the mouth of a receptacle to be filled.

Fig. 7 represents a section on line 7—7 of Fig. 2.

Fig. 8 represents a section on line 8—8 of Fig. 2.

Fig. 9 represents a plan view of an adjustable guide rail seen in the top left hand portion of Fig. 8, and hereinafter further referred to.

Referring to the drawings, in which like reference characters indicate like parts, and more particularly to Figs. 1, 2, and 3, 1 designates a filling machine embodying my invention, supported on a frame composed of the upright legs 2 to which are secured the lower and upper horizontal braces or cross bars 3 and 4. Through the bottom portions of the legs 2 extends a horizontal tubular frame member 5, to the ends of which are secured the tubular uprights 6, which carry at their upper ends the transverse channel irons 7 and 7x. To the right hand ends of the cross bars 4 are secured the angle irons 8, which together with the right hand end channel iron 7 form supports for the ends of the angle iron rails 9, the walls 11 of which form ways or guides which will be hereinafter further described. To the left hand ends of the cross bars 4 are secured the angle irons 8x, which, together with the end channel iron 7x form supports for the ends of the angle iron rails 10, the walls 12 of which will be hereinafter further referred to. At the upper ends 13 of the legs or upright frame members 2 is supported the main supply tank 14 which carries the auxiliary measuring tank 15.

Referring to Figs. 4 and 5, it will be seen that the supply tank 14 is provided with the inlet pipe 16, carried by the bracket 18 clamped upon the arms 19 which are pivotally mounted on the rod 20 fixedly mounted in the upper walls of the measuring tank 15. The pipe 16 is controlled by the valve 22, having the downwardly projecting valve stem 23, and leads into the main tank 14 through the pipe 24. The free ends of the arms 19 form at their rear ends the U-shaped portion 25, which is connected to the upper threaded end 26 of the rod 27 by means of the adjustment nuts 28.

Referring to Fig. 3, it will be seen that the rod 27 is pivotally secured at its lower end to the arm or crank 29 carried by the outer end of the shaft 30, which is journalled in the cross bars 3. The shaft 30 carries the sprocket wheel 31 over which passes the sprocket chain 32 which also passes over the sprocket pinion 33 carried by the shaft 34 which is provided at its other or front end with the crank handle 35. 36 designates a float carried by the arms 37 which are pivotally mounted on the rod 20 above mentioned, said float having in the top thereof the screw 38, retained by the adjustment nut 39, and being adapted to displace the liquid from the main tank 14 to the measuring tank 15, which is divided into a number of measuring compartments 40 formed by the partitions 41, as will be understood from Fig. 5. 42x designates a sight gauge whereby the level of the fluid inside the tank may be visually ascertained from without. The upper edges of the partitions 41 forming the compartments 40 are positioned below the upper edge of the main tank 14 to permit the flow of liquid from said main tank 14 into said compartments when the float 36 is pressed downwardly or when the level of the liquid in the tank 14 is higher than the upper edges of the partitions 41. The compartments 40 are provided with the bottom outlets 42, which are normally closed by the hollow valves 43, which are retained in their normal closing position by the weights 44, which are adjustably carried by the upper threaded ends 45 of the valve stems 46.

Referring to Fig. 6, it will be seen that the valves 43 are of generally inverted cup-shaped form and are provided with the upper ports 48 and with the annular gaskets 50. The cup-shaped valves are threaded to the lower ends 51 of the valve stems 46. The bottom ends 52 of the hollow or inverted cup-shaped valves 43 pass through openings 52x in the plate 53 which is carried by and adapted to slide upwardly on the pins 53x which depend from the bottom of the tank 15 (see Fig. 2), said plate being provided with the pendant flanges 54. The valves 43 are provided with the flexible hose members 55, which carry suitable nozzles 56 adapted to enter the mouth 57 of the can or receptacle 58 (see Fig. 6).

The shaft 30 carries the cam 60, which carries the arm or crank 61, to which is pivoted one end of the link 62, the other end of which is pivoted at 63 to the lever 64 whose lower end is pivoted at 65 to the bottom tubular frame member 5, as will be best understood from Figs. 1 and 2. To the upper end of the lever 64 is connected the elbow 67, which carries the pusher 68 which is provided with the adjustment fingers 69 and which is adapted to reciprocate between and to be guided by the walls 11 of the rails 9 in a manner and for a purpose hereinafter further described. 70 designates a platform or table carried by the ram 71, which is guided in its bearing 72 and which carries at its lower end the roller 73 which contacts with the working face of the cam 60. The table 70 is provided with the pendant guide pins 75, which are guided in holes in the top of the cross bars or frame members 4 (see Figs. 1 and 2). The shaft 30 also carries the stop or detent 76, which is adapted to engage one end of the lever 77 which is fulcrumed at 78 to the lower cross frame member 3 and to the rear end 79 of which is secured the spring 80, anchored at its upper end to the cross member 4, and the rod 81, the lower end 82 of which engages the foot pedal 83, the inner end of which is fulcrumed or pivoted at 85 to a suitable fixed point. The table 70 is provided with the vertical ribs 88 and with the side guides 89, best seen in Fig. 9. The side guides 89 are composed of angle irons 90 carried by the brackets 91, the rear slotted ends 92 of which are adjustably engaged by the bolts or screws 93. The shaft 34 carries the roller 95 which is adapted to be revolved when the crank handle 36 is turned. 96 designates a series of rollers journalled in the walls 12 of the angle iron rails 10 and over which the trays 97 containing the filled receptacles 58 are adapted to travel.

Referring to Fig. 5a, it will be seen that the valve 22 is composed of a casing 100 having an upper chamber 101 into which leads the intake pipe 16 and a lower chamber 102 from which leads the pipe 24 into the tank 14. The chambers 101 and 102 are divided by the partition 103 which is provided with the port 104 and the tapering bottom valve seat 105. The pressure of the liquid in the pipe 16 and chamber 101 serves to displace the tapered valve head 106 from the valve seat 105 to permit the flow of liquid from the pipe 16 into the pipe 24 through the port 104. The contact of the screw 38 with the bottom end of the valve stem 23 (when the float 36 is in the raised position shown in dotted lines in Fig. 5) presses the tapered valve head 106 against the seat 105 to close the port 104 and to stop the flow of the liquid through the port 104. 107 designates a suitable packing to prevent leakage. While I have described one type of valve for controlling the flow of liquid through the pipes 16 and 24 into the tank 14, it is to be understood that any other type of valve may be used without departing from the scope of my invention.

The operation is as follows:

When the float 36, see Fig. 5, is in its lower position, the valve 22 is open and the tank 14 is filled with the desired liquid through the pipes 16 and 24. As the level of the liquid in the tank 14 rises, it raises the float 36 until the latter assumes the position shown in dotted lines in Fig. 5, in which position the adjustable screw 38 in the top of the float 36 exerts pressure against the stem 23 of the valve 22, thereby closing said valve and stopping the inflow of the liquid into the tank 14. Upon the depression of the pedal 83 the machine is unlocked, and the crank handle 35 is then turned to revolve the sprocket wheel 33 which revolves the sprocket wheel 31, by means of the sprocket chain 32, thereby actuating the arm or crank 29 and pulling the rod 27 and arms 19 downwardly, thereby depressing the float 36 into the tank 14 to displace the liquid therein, which then flows over the edges of the partitions 41 into the compartments 40 to fill the latter, said compartments being made of any desired volumetric capacity to hold a predetermined or measured quantity of liquid. In this position of the parts the table 70 is on a level with the rails 9, on which is adapted to slide the tray 97 containing a number of receptacles corresponding to the number of compartments in the tank 15. The handle 35 is then further turned which actuates the shaft 30 carrying the arm or crank 61, which thereupon exerts a pull on the lever 64, through the link 62, to push the tray 97 by means of the pusher 68 over the rails 9 towards and upon the table 70. Further actuation of the crank handle 35 will revolve the cam 60 on the shaft 30 into the position seen in Fig. 2 thereby raising the ram 71, carrying the table 70, and the tray 97 carried by said table upwardly to introduce the nozzles 56 of the measuring compartments 40 into the mouths 57 of the cans 58 in the tray 97, as seen in Fig. 6. The pendant flanges 54 of the plate 53 carried by the lower ends 52 of the hollow valves 43 (see Fig. 6) now contact with the tops of the receptacles 58 in the raised tray 97, thereby raising said hollow valves 43 upwardly against the weights 44 and permitting the liquid in the measuring compartments 40 to flow through the ports 48 and the nozzles 56 into the receptacles 58. Further actuation of the crank handle 35 further revolves the cam 60 to lower the table 70 to the level of the rails 10 and the tray 97 carrying the filled receptacles 58 is then pushed off the table 70 by the next succeeding tray 97 on the rails 9 (which is being actuated by the lever 64 and pusher 68 in the manner above set forth) and the roller 95 (see Fig. 2) carried by the shaft 34 which is revolved by the crank 32 serves to actuate the tray 97 containing the filled receptacles 58 on to the rollers 96.

The ribs 88 on table 70 (see Fig. 8) provide knife edge supports for the trays 97 containing the empty cans 58 to reduce friction and to facilitate the sliding of said trays on the rails 9 between the guide walls 11 onto the table 70 by means of the pusher 68. The side guides 89 serve to guide and retain the trays 97 while the latter are on the platform 70, said guide rails being adjusted to the size of said trays by means of the screws 93 engaging the slotted ends 92 of said guides.

When the float 36 has been depressed to displace the liquid in the tank 14 into the compartments 40 in the measuring tank 15, the float 36 remains in its lower position due to the absence of liquid in the tank 14, and the valve 22 is again automatically opened and a fresh supply of liquid flows through the pipes 15 and 24 into the tank 14 until the float 36 is again raised by the rise of the level of the liquid in the tank 14 whereupon said valve 22 is again shut off by the pressure of the screw 38 against the stem 23 of said valve, to stop the flow of liquid into the tank 14 until the crank 35 is again turned to depress the float 36 by means of the arms 19, rod 27, and arm 29, and their adjuncts, again to displace the liquid from the tank 14 in the manner above set forth. The screw 38, which is carried by the float 36 and which serves to close the valve 22, has the adjusting nut 39, so as adjustably to control and regulate the opening and closing of said valve. The stop 76, coacting with the lever 77, serves to lock the apparatus and to prevent the accidental turning of the shaft 30, thus affording positive control of the filling machine.

My novel machine as illustrated is designed for filling the containers simultaneously, but it will be understood that the number of containers may be increased or diminished according to requirements.

It will be understood in practice that the capacity of each of the measuring units is made to hold when brimful a little more than the desired unit of measure, which is done because when casting the measuring tank there is liable to be some variation in the size of each unit so by turning down or adjusting the weight or displacer 44 to the desired extent each measuring unit can be thus regulated to hold when brimful the exact amount of liquid desired. It will be further apparent from the foregoing that the float or displacer 36 serves two functions since, first, it shuts off the flow of liquid into the supply tank when the predetermined amount is reached at the high water level by coming in contact with the stem 23 through the adjustable screw 38; and, second, said float functions to displace the liquid into the measuring tank as hereinabove described.

It will be further apparent that the motion of the crank 35 through the intermediate mechanism causes the submerging of the float 36, thereby elevating the water level from the "high water level" to the "flooding level", thereby causing an overflow into the measuring tanks and filling them. The upward stroke of the crank 35 causes the float 36 to be released and allows the water level to fall back to the low water level and also allows more liquid to enter the supply tank through the valve 22.

The employment of the short flexible tubes 55, best seen in Fig. 6, in conjunction with the pointed nozzles 56 facilitates the entering of said nozzles or spouts into the neck of the can to be filled. The sight gauge 42x, which is connected to one of the filling units, shows the operator when the units are empty and he may proceed to turn the crank 35, thus lowering the table, whereupon the pusher will push forward another tray of empty cans, which will push the filled case off the table 70 onto the driven roller 95, seen in Fig. 2, and thence to the conveyor rollers 96, seen at the left of said figure. It will be seen from the foregoing that upon the depression of the foot pedal 83 and the unlocking of the apparatus the movements of all the other elements take place in a synchronous and timed relation which is manually controlled by the actuation of the crank handle 35. The shaft 30 and its cam 60 carried thereon perform an important function since the actuation of said shaft 30 causes the working faces of the cam 60 to raise and lower the table 70 at the proper intervals and the connections from said cam 60 through the push devices seen at the right in Fig. 2 effect the synchronous movement of the unfilled containers towards and upon the table 70 at the proper intervals, and the elevation of the table 70 into its extreme upper position effects, through the medium of the elements seen in Fig. 6, the unseating of the hollow valves 43 at the proper intervals.

Having thus described my invention, what I claim as new, and desire to secure by Letters Patent, is:

1. In a device of the character stated, a vertically movable table, a ram depending from said table, a cam below said ram for actuating the latter, a laterally movable pusher, actuating means intermediate said cam and said pusher, a shaft for said cam, a manually operated crank handle, connections from said handle to said cam shaft, a supply tank, a measuring tank in communication therewith, a displacing float in said supply tank, and connections from said cam shaft for depressing said float.

2. In a device of the character stated, a vertically movable table, a ram depending from said table, a cam below said ram for actuating the latter, a laterally movable pusher, actuating means intermediate said cam and said pusher, a shaft for said cam, a manually operated crank handle, connections from said handle to said cam shaft, and means for normally locking said cam shaft in inoperative position.

3. In a device of the character stated, a vertically movable table, a ram depending from said table, a cam below said ram for actuating the latter, a laterally movable pusher, actuating means intermediate said cam and said pusher, a shaft for said cam, a manually operated crank handle, connections from said handle to said cam shaft, a supply tank, a measuring tank in communication therewith, a displacing float in said supply tank, connections from said cam shaft for depressing said float, means for normally locking said cam shaft, and foot actuated means for unlocking said cam shaft and its adjuncts.

4. In a device of the character stated, the combination of a tank adapted to contain a liquid, a float displacer adapted to act on said liquid, a vertically movable table, a laterally reciprocating pusher, a rotatable cam, a manually operable handle, connections therefrom to said cam, connecting links from said cam to said table and pusher for operating said table and pusher synchronously and in unison and a measuring unit for receiving the liquid displaced from said tank.

5. In a device of the character stated, a supporting frame, horizontally disposed guide rails carried thereby and adapted to receive a battery of empty receptacles, a vertically movable table in proximity to said guide rails, a horizontally disposed pusher slidably mounted on said guide rails, a cam, a cam shaft, connections from said cam to said table for raising and lowering the latter, connections from said cam to said pusher for propelling the empty receptacles positioned on said rails onto said table, a supply tank carried by said frame, a float pivotally mounted above said supply tank, a measuring tank above said table communicating with said supply tank, normally closed valved outlets for said measuring tank, and means actuated from said cam shaft for depressing said float.

6. In a device of the character stated, a supporting frame, horizontally disposed guide rails carried thereby and adapted to receive a battery of empty receptacles, a vertically movable table in proximity to said guide rails, a horizontally disposed pusher slidably mounted on said guide rails, a cam, a cam shaft, connections from said cam to said table for raising and lowering the latter, connections from said cam to said pusher for propelling the empty receptacles positioned on said rails onto said table, a supply tank carried by said frame, a float pivotally mounted above said supply tank, normally closed valved outlets for said measuring tank, means actuated from said cam shaft for depressing said float, and means carried by said measuring tank adapted to be actuated by the rise of said table to open said outlets.

7. In a device of the character stated, a measuring tank having a valved outlet, a hollow ported vertically movable valve controlling said outlet, an adjustable weight carried by said valve, a pointed apertured nozzle, and a flexible connection between said valve and nozzle.

8. In a device of the character stated, a measuring tank having a valved outlet, a hollow ported vertically movable valve controlling said outlet, an adjustable weight carried by said valve, a pointed apertured nozzle, a flexible connection between said valve and nozzle, and means for automatically unseating said valve prior to the filling operation.

9. In a device of the character stated, a main supply tank, a displacer, an inlet pipe for conveying fluid into said main tank, an upwardly seating valve in said inlet pipe, a pendant valve stem for said valve, an adjustable stem carried by said displacer, and adapted to contact with said valve stem to close said valve when said displacer is in its elevated position, and means for depressing said displacer.

10. In a device of the character stated, a supply tank, a measuring tank communicating therewith, a float pivotally mounted above said supply tank, a vertically movable table below said measuring tank, an upper driving shaft, a lower driven cam shaft, driving connections from said driving to said driven shaft, an arm carried by the rear end of said lower shaft, actuating means intermediate said crank and float for depressing the latter, a cam carried by the front end of said lower cam shaft, actuating means intermediate said cam and table for raising and lowering the latter, an arm carried by said cam, guide rails adapted to carry a tray, a pusher slidably mounted on said rails, and actuating connections intermediate said arm and said pusher for propelling a tray on said rails onto said table when the latter is in its lower position.

11. In a device of the character stated, a supporting frame, a supply tank carried by said frame and adapted to contain a liquid, a measuring tank communicating with said supply tank, a plurality of measuring compartments in said measuring tank, a valved inlet for said supply tank, a float pivotally mounted above said supply tank and adapted to coact with said valved inlet to control the flow of liquid into said supply tank, means for depressing said float to displace said liquid from said supply tank into said measuring tank, a vertically movable table below said measuring tank, a cam element for raising and lowering said table, guide rails adjacent said table adapted to receive a battery of empty receptacles to be filled, and means for propelling said empty receptacles from said rail onto said table when the latter is in its lowermost position.

12. In a device of the character stated, a supporting frame, a supply tank carried thereby and adapted to contain a liquid, a valved inlet for said tank, a measuring tank carried by and communicating with said supply tank, a plurality of measuring compartments in said measuring tank having their upper ends open and positioned below the upper edge of said supply tank, bottom valved outlets for said measuring compartments, a float pivotally mounted above said supply tank, means for depressing said float to displace the liquid in said supply tank into said measuring compartments, a vertically movable table positioned below said measuring tank, guide rails adjacent said table adapted to receive a battery of empty receptacles, a cam for elevating said table to bring the mouths of said receptacles into operative alignment with the outlets of said measuring compartments, and means for propelling said empty receptacles onto said table when the latter is in its lower position.

13. In a device of the character stated, a supporting frame, a supply tank carried thereby and adapted to contain a liquid, a valved inlet for said tank, a measuring tank communicating with said supply tank, a plurality of measuring compartments in said measuring tank having their upper ends open and positioned below the upper edge of said supply tank, bottom valved outlets for said measuring compartments, a float pivotally mounted above said supply tank and adapted to coact with said valved inlet, means for depressing said float to displace the liquid in said supply tank into said measuring compartments, a vertically movable table positioned below said measuring tank, guide rails leading to a side of said table and adapted to receive a battery of empty receptacles to be filled, a cam for raising said table to bring the mouths of said receptacles into registration with the outlets of said measuring compartments, means actuated by said receptacles to open said valved outlets, means to propel said battery of empty receptacles on said guide rails onto said table when the latter is in its lower position, and rollers in proximity with the opposite end of said table adapted to receive the battery of filled receptacles from said table when the latter is returned to its lower position, after said receptacles have been filled.

14. In a device of the character stated, a supporting frame, a supply tank carried thereby and adapted to contain a liquid, a normally open valved inlet for said supply tank, a measuring tank, a plurality of measuring compartments in said measuring tank communicating with said supply tank, a float pivotally mounted in operative relation to said supply tank and adapted to displace the liquid from said supply tank into said measuring compartments, means for depressing said float, said float being adapted when raised by the liquid in said supply tank to close said valved inlet to stop the flow of liquid into said supply tank, normally closed valved bottom outlets for said measuring compartments, a vertically movable table below said outlets adapted to receive a battery of receptacles to be filled, means for elevating said table to bring the mouths of said receptacles into registration with said outlets, and means operated by the raising of said receptacles to open said outlets to permit the flow of liquid from said measuring compartments into said receptacles.

15. In a device of the character stated, a supporting frame, a supply tank carried thereby, a normally open valved inlet therefor, a float pivotally mounted in operative relation to said tank, said float being adapted when raised by the rise of the liquid level in said tank to coact with said valved inlet to stop the flow of liquid into said supply tank, a measuring tank carried by said supply tank, a plurality of measuring compartments therein, the upper ends of said compartments being open and positioned below the upper edges of said tanks, means for depressing said float to displace the liquid from said supply tank into said measuring compartments, normally closed valved outlets for said measuring compartments, flexible nozzles for said outlets, a vertically movable table adapted to carry a battery of empty receptacles to be filled, means for raising said table to introduce said nozzles into the mouths of said receptacles, and means carried by said outlets adapted to be actuated by the raising of said receptacles to open said valved outlets to permit the flow of liquid from said measuring compartments into said receptacles.

16. In a device of the character stated, a support, a supply tank carried thereby, a normally open valved inlet therefor, a float pivotally mounted in operative relation to said tank, said float being adapted when raised by the rise of the liquid level in said tank automatically to close said valved inlet to stop the flow of liquid into said supply tank, a measuring tank carried by said supply tank, a plurality of measuring compartments therein, the upper ends of said compartments being open and below the upper edges of said tanks, means for automatically depressing said float to displace the liquid from said supply tank into said measuring compartments, normally closed valved outlets for said measuring compartments, flexible nozzles for said outlets, a vertically movable table adapted to carry a battery of empty receptacles to be filled, means for automatically raising said table to introduce said nozzles into the mouths of said receptacles, means carried by said outlets and adapted to be automatically actuated by the raising of said receptacles to open said valved outlets to permit the flow of liquid from said measuring compartments into said receptacles, and means for automatically replacing the battery of filled receptacles on said table with a battery of empty receptacles to be filled.

17. In a device of the character stated, the combination of a tank adapted to contain a liquid, a float displacer adapted to act on said liquid, a measuring unit for receiving the liquid displaced from said tank, a vertically movable table, below said float displacer, a laterally reciprocating pusher at one side of said table, a rotatable cam, a manually operable handle, connecting links therefrom to said cam, connections from said cam to said table and pusher for operating said table and pusher synchronously and in unison, and a driven roller operated by said handle at the side of said table opposite to said pusher for propelling filled receptacles from said table.

ABRAHAM S. KIRSHNER.